No. 649,395.　　　　　　　　　　　　　　　　Patented May 8, 1900.
P. O. E. BOUDREAUX.
BOLT LOCK.
(Application filed Oct. 2, 1899.)
(No Model.)
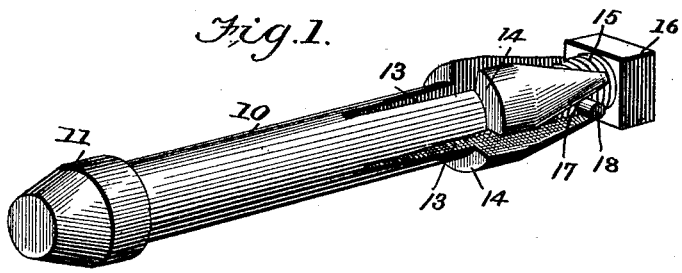
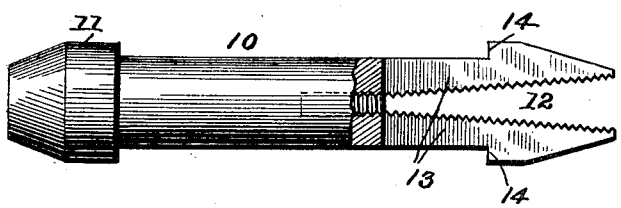
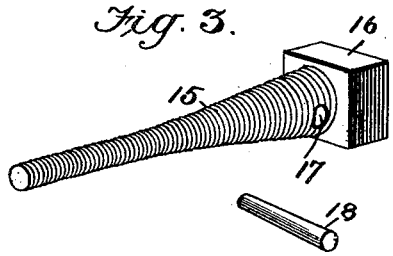
WITNESSES:　　　　　　　　　　　　　　　　INVENTOR
Jos. A. Ryan　　　　　　　　　　　　Paul O. E. Boudreaux
F. S. Stitt　　　　　　　　　　　　　　BY Munn & Co.
　　　　　　　　　　　　　　　　　　　　　　ATTORNEYS

UNITED STATES PATENT OFFICE.

PAUL O. E. BOUDREAUX, OF THERIOT, LOUISIANA, ASSIGNOR OF ONE-HALF TO LUKE BOUDREAUX, OF SAME PLACE.

BOLT-LOCK.

SPECIFICATION forming part of Letters Patent No. 649,395, dated May 8, 1900.

Application filed October 2, 1899. Serial No. 732,313. (No model.)

*To all whom it may concern:*

Be it known that I, PAUL O. E. BOUDREAUX, of Theriot, in the parish of Terre Bonne and State of Louisiana, have invented a new and useful Improvement in Bolt-Locks, of which the following is a specification.

My invention relates to bolts and means for locking the same; and it has for its object a bolt which can be easily and yet securely locked in place and one which can be cheaply made.

The invention consists in certain details of construction, which I shall first describe, and then point out in the appended claim.

Reference is to be had to the accompanying drawings, in which like characters of reference indicate corresponding parts.

Figure 1 is a perspective view of my improved bolt with the locking-screw in position therein. Fig. 2 is a side view of the same, partly broken away and with the screw detached; and Fig. 3 is a perspective view illustrating the locking screw and key detached.

My improved bolt 10 is formed at one end with an integral head 11 and at its other end has a tapering threaded bore 12, which is divided by four radial and tapering slots 13. Each section of this end of the bolt thus divided is provided with a shoulder 14, which together form a bearing for a washer or the like when the bolt is in place.

The tapered screw 15, formed with a head 16 and an opening 17, extending therethrough below the head, is adapted to be screwed into the threaded bore 12 until the opening 17 comes within one of the slots 13, when the key 18 is inserted through the opening 17 and extends beyond the screw, preferably on both sides, so that when said key is in place any turning of the screw will cause the key to engage with a side wall of a slot, and thus prevent the retraction of the screw. It should be especially observed that the screw 15 will be kept in place at different points within the bore 12 just so long as the key 18 lies within one of the slots 13, so that it is possible to spread apart the sections of the end of the bolt to a greater or lesser degree, as may be desired.

Having thus described my invention, what I claim as new, and desire to secure by Letters Patent, is—

The herein-described bolt-lock, comprising a bolt having a tapering screw-threaded bore in one end and equidistant tapering slots dividing said bore into sections, each of the sections thus formed being provided with a shoulder, and a tapering screw arranged to work in the said bore and formed with a head and a transverse opening therethrough below said head, the said opening being adapted to receive a key which projects beyond said screw to engagement with the side walls of two opposite slots when the screw is in place in the bore, as and for the purpose set forth.

In testimony whereof I have signed my name to this specification in the presence of two subscribing witnesses.

PAUL O. E. BOUDREAUX.

Witnesses:
HENRY M. BOURG,
ARTHUR A. ARSENAUX.